United States Patent [19]

Andrews

[11] Patent Number: 5,052,548

[45] Date of Patent: Oct. 1, 1991

[54] SANITARY FLEXIBLE BAND CONVEYOR

[75] Inventor: Joseph D. Andrews, Woodstown, N.J.

[73] Assignee: Caddy Corporation of America, Bridgeport, N.J.

[21] Appl. No.: 484,355

[22] Filed: Feb. 22, 1990

[51] Int. Cl.[5] .............................................. B65G 15/10
[52] U.S. Cl. .................................... 198/817; 198/841; 198/831
[58] Field of Search ............... 198/841, 831, 626, 627, 198/604, 626.1, 626.5, 626.6, 841, 831, 604, 817

[56] References Cited

U.S. PATENT DOCUMENTS

| 1,123,999 | 1/1915 | DuPuy | 198/817 |
| 1,476,936 | 12/1923 | Walden | 198/817 |
| 2,768,732 | 10/1956 | Muhlenbruch | 198/817 X |
| 2,962,152 | 11/1960 | Lathrop | 198/841 X |
| 3,258,866 | 7/1966 | Bates | 198/817 X |
| 3,289,818 | 12/1966 | Kittredge | 198/841 X |
| 3,511,360 | 5/1970 | Jagiel | 198/841 X |
| 4,479,574 | 10/1984 | Julius et al. | 198/841 X |
| 4,542,820 | 9/1985 | Maxner | 198/817 |
| 4,556,143 | 12/1985 | Johnson | 198/841 |

FOREIGN PATENT DOCUMENTS 1303185 1/1973 United Kingdom ............... 198/817

Primary Examiner—D. Glenn Dayoan
Attorney, Agent, or Firm—Pasquale A. Razzano

[57] ABSTRACT

A sanitary conveyor system is disclosed in which a conveyor bed, with or without curves, is mounted on a frame for movement of food trays between a plurality of work stations or movement of soiled trays from the cafeteria to the ware-washing area. A central box channel is mounted remote from the work stations and is provided juxtaposed to and below the pair of conveyor beds. The conveyor system includes a first set of pulleys being disposed adjacent to the tail end of the conveyor beds which are horizontally aligned and angled upwardly from the box channel to the conveyor beds such that each belt in the lower return flight path of the box channel are moved upwardly to the corresponding upper flight path of the conveyor bed. A second set of pulleys is disposed adjacent to the drive end of the conveyor bed and operatively connected to a belt drive unit such that belts are moved from the upper flight path of the conveyor bed to the lower return flight path of the box channel. Accordingly, in the lower return flight path, the belts are constrained within the box channel during their lower return flight path remote from the work stations.

23 Claims, 8 Drawing Sheets

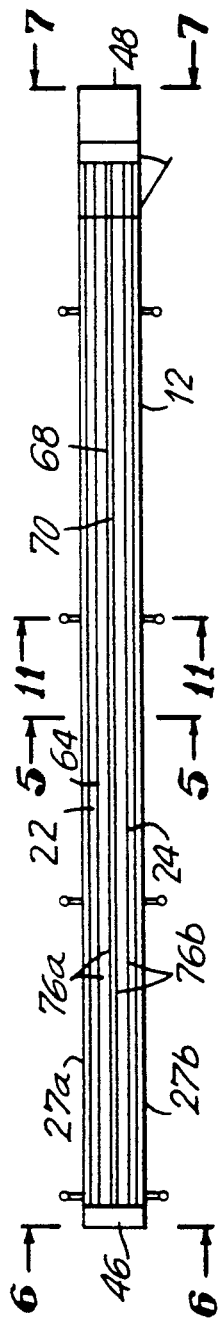
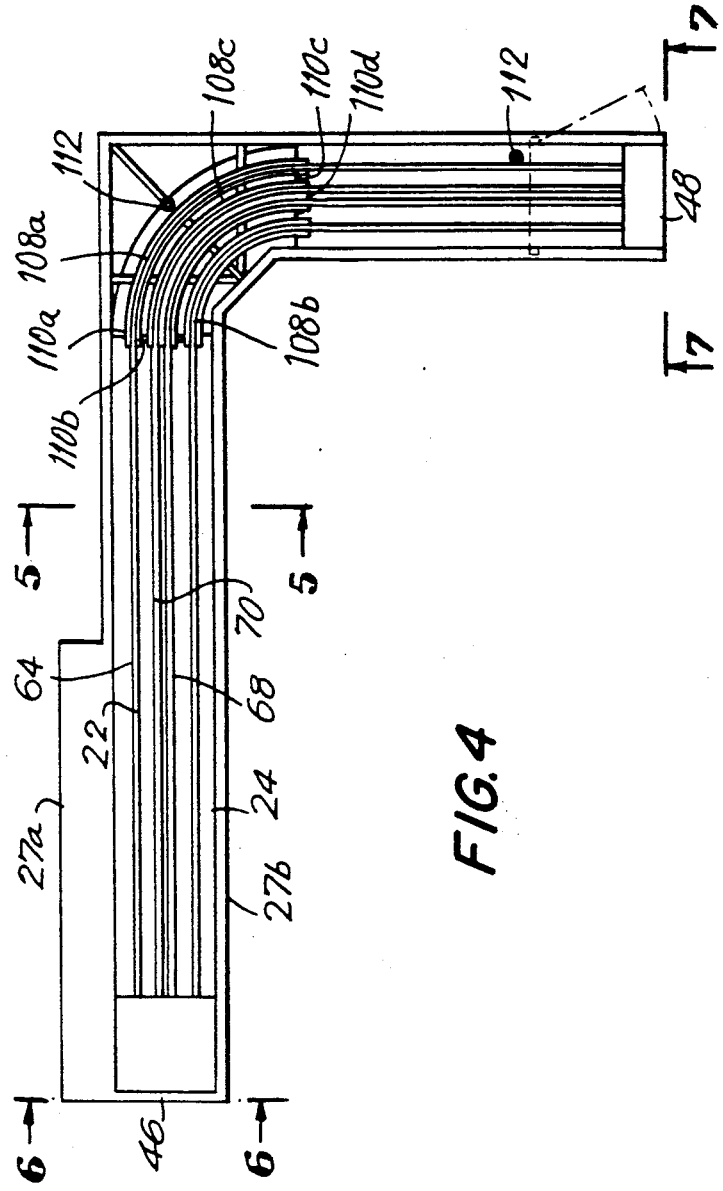
FIG. 3
FIG. 4

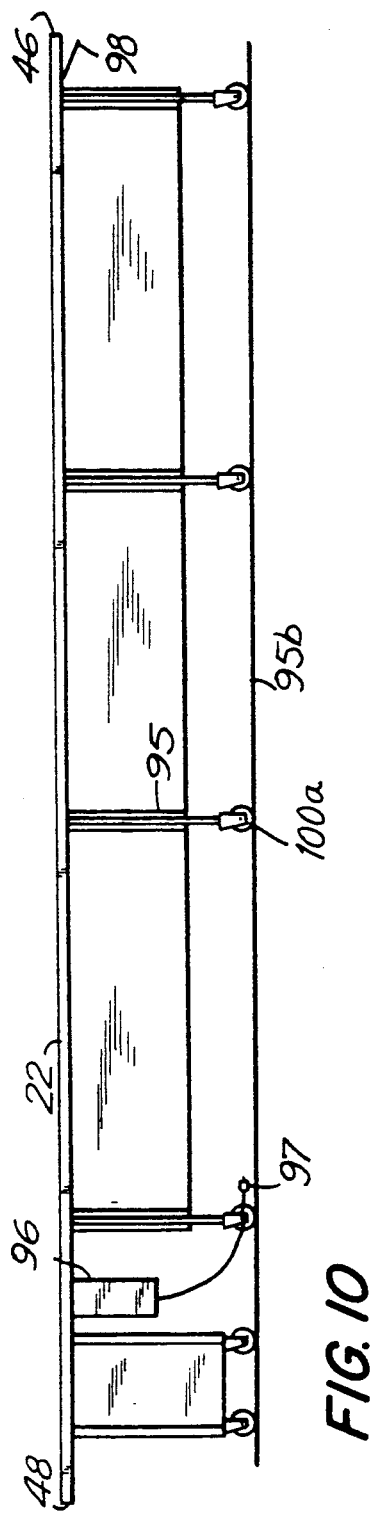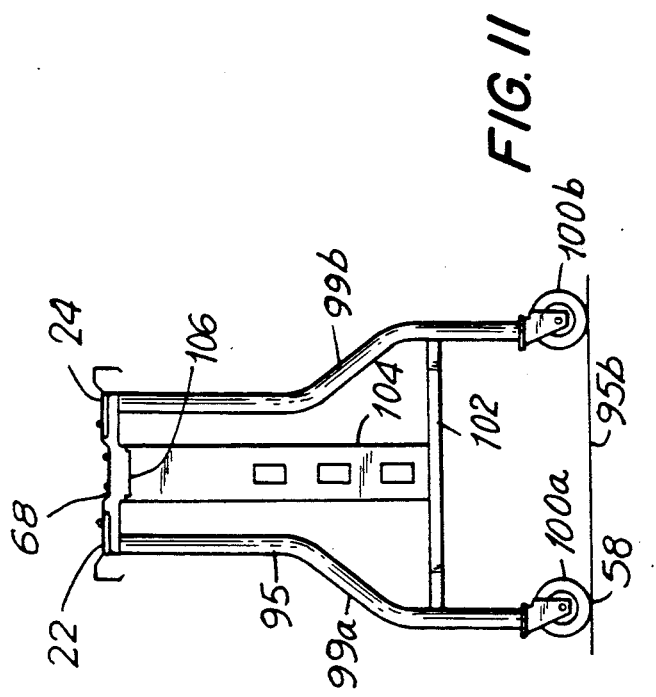

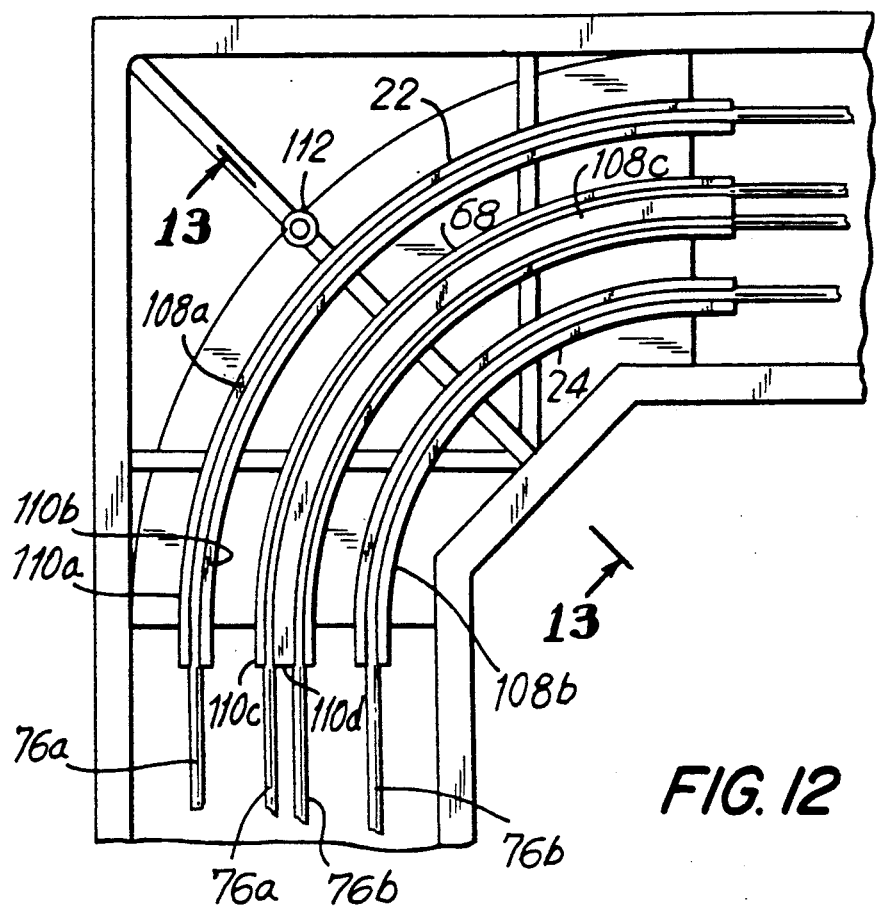
FIG. 12
FIG. 13
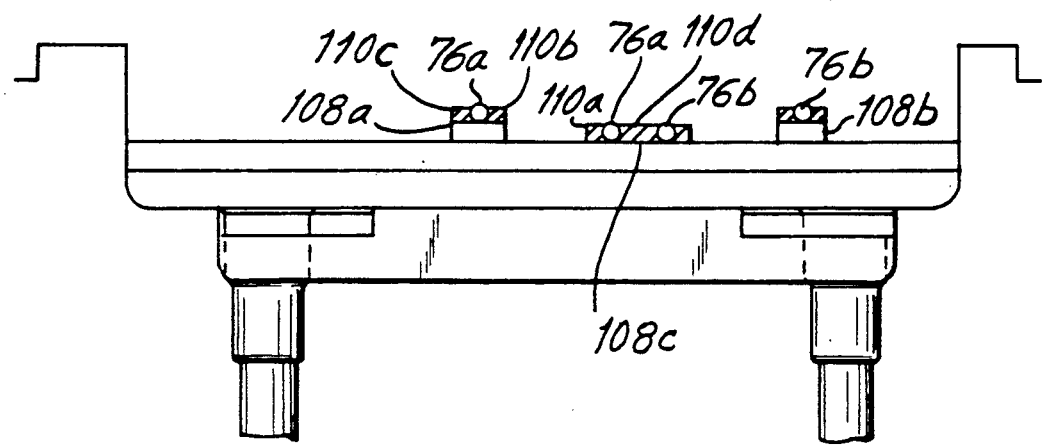

SANITARY FLEXIBLE BAND CONVEYOR

BACKGROUND OF THE INVENTION

The present invention relates to conveyor systems, and more particularly to conveyor systems using a continuous, unbroken conveyor belt which is particularly adapted for use in the food service industry for transporting food trays and the like.

In previous conveyor systems, particularly those adapted for use in the food service industry, the conveyor is driven by a single large drive motor engaged with a sprocket or roller at one end of the conveyor where the transition is made from an upper conveyor flight to a lower return flight which is positioned underneath the conveyor bed. Additionally, a generally vertically aligned pulley is positioned at one end of the conveyor bed to direct the conveyor belt on its return path beneath the conveyor bed. If, however, food tray preparation work stations are positioned along the side edge of the conveyor bed or are actually positioned beneath the conveyor bed, such a design is unsanitary as material remaining on the belt during its lower return path may fall on the floor or on items associated with the work stations, such as food, dishes, plates, etc. With such a conveyor design, due to health concerns, food containers cannot be placed under the conveyor bed. Accordingly, the work stations had to be positioned away from the conveyor bed and additional space for the conveyor system was required.

In order to conserve space, it is also typical for such conveyor systems to have a path which is at some point curved. In the past, chains which can flex in a horizontal plane have been used in order to make the turn, for example, belt chains similar to bicycle drive chains; whose links are held together by lateral horizontal pins. Belt chains, however, are not well suited for use in the food service industry where sanitary concerns are extremely important. Accordingly, it is advantageous to provide a belt conveyor which not only is extremely sanitary, but also can negotiate a curved path of the conveyor bed.

OBJECTS OF THE INVENTION

Therefore, it is an object of the present invention to provide a conveyor system for use in the food service industry for transporting food trays, or soiled trays and the like which avoids the aforementioned disadvantages of the prior art.

Another object of this invention is to provide a conveyor system for use in the food service industry which is extremely sanitary.

A further object of this invention is to provide a conveyor system wherein the conveyor belt negotiates a curved portion of the conveyor bed, and additionally, transports the tray containers through the curved section.

Another object of the present invention is to provide a relatively simply constructed conveyor system which is simple in operation and safe to use.

An additional object of the present invention is to provide a conveyor system for the food service industry which is relatively lightweight, durable in construction, readily accessible, and easily cleaned.

Various other objects, advantages, and features of the present invention will become readily apparent from the ensuing detailed description, and the novel features will be particularly pointed out in the appended claims.

SUMMARY OF THE INVENTION

In accordance with an aspect of the present invention, the conveyor system provided is particularly adapted for use in the food service industry for transporting food trays, or soiled trays and the like. The system includes a frame which defines a conveyor path of travel of relatively great length and typically having one or more horizontal curves or turns in the conveyor. A pair of corresponding conveyor beds are mounted on the frame and define upper flight paths to move the food trays or soiled trays thereon. In food preparation, a plurality of work stations are positioned along one side edge of each of the conveyor bed. A different item, such as food or beverage or their associates containers, are placed on the tray containers at each of the work stations. In soiled tray systems, soiled dishes are transported from the cafeteria to the ware-washing area.

A central box channel is mounted on the frame between the pair of conveyor beds and defines a lower return flight path of the conveyor. The box channel is mounted below the side edge of each conveyor bed opposite to the side edge adjacent to the work stations.

A pair of endless conveyor belts are mounted within the frame for movement along the conveyor path of travel between the corresponding upper and lower return flight paths. Preferably, the belts are made of a flexible, polymeric material.

Due to the driving mechanism of this conveyor system, the return belt path does not have to be positioned underneath the conveyor bed. It includes a first set of pulleys being disposed adjacent to the tail end of the conveyor beds which are generally horizontally aligned and angled upwardly such that each belt in the lower return flight path within the box channel is moved upwardly to the corresponding upper flight path of the conveyor bed. Additionally, a second set of drive pulleys are disposed adjacent to the conveyor beds which are operatively connected to a belt drive unit such that the belts are moved from the upper flight path to the lower return flight path. In accordance with a general aspect of this invention, the belts are thus constrained within the box channel on their lower return flight paths remote from the work stations. Thus, a sanitary environment for food tray preparation or soiled trays is provided wherein material falling from the belt on its lower return flight path will fall into the box channel and not on the floor or on the work stations.

As aforementioned, the conveyor beds and the box channel can include corresponding curved sections. In the curved section of each conveyor bed and the box channel, raised portions are provided on both sides of the belts which are formed of a polymeric material to retain the belts along the upper or lower flight paths in the curved sections.

BRIEF DESCRIPTION OF THE DRAWINGS

The following detailed description, given by way of example but not intended to limit the invention solely to the specific embodiments described, may best be understood in conjunction with the accompanying drawings in which:

FIG. 3 is a top plan view of a preferred embodiment a conveyor frame which may be adapted to the conveyor system of FIGS. 1 and 2;

FIG. 4 is a top plan view of a conveyor frame, similar to FIG. 3, which has a curved section, and can be adapted to be used for food tray preparation or soiled trays to the conveyor system of FIGS. 1 and 2;

FIG. 10 is a front elevational view of the conveyor frame of FIG. 3;

FIG. 11 is a cross-sectional view of the conveyor frame taken along line 11—11 of FIG. 3;

FIG. 12 is an enlarged top plan view of the curved section of FIG. 4; and

FIG. 13 is a cross-sectional view taken along line 13—13 of FIG. 12.

DETAILED DESCRIPTION OF PREFERRED EMBODIMENTS

Figure 1:
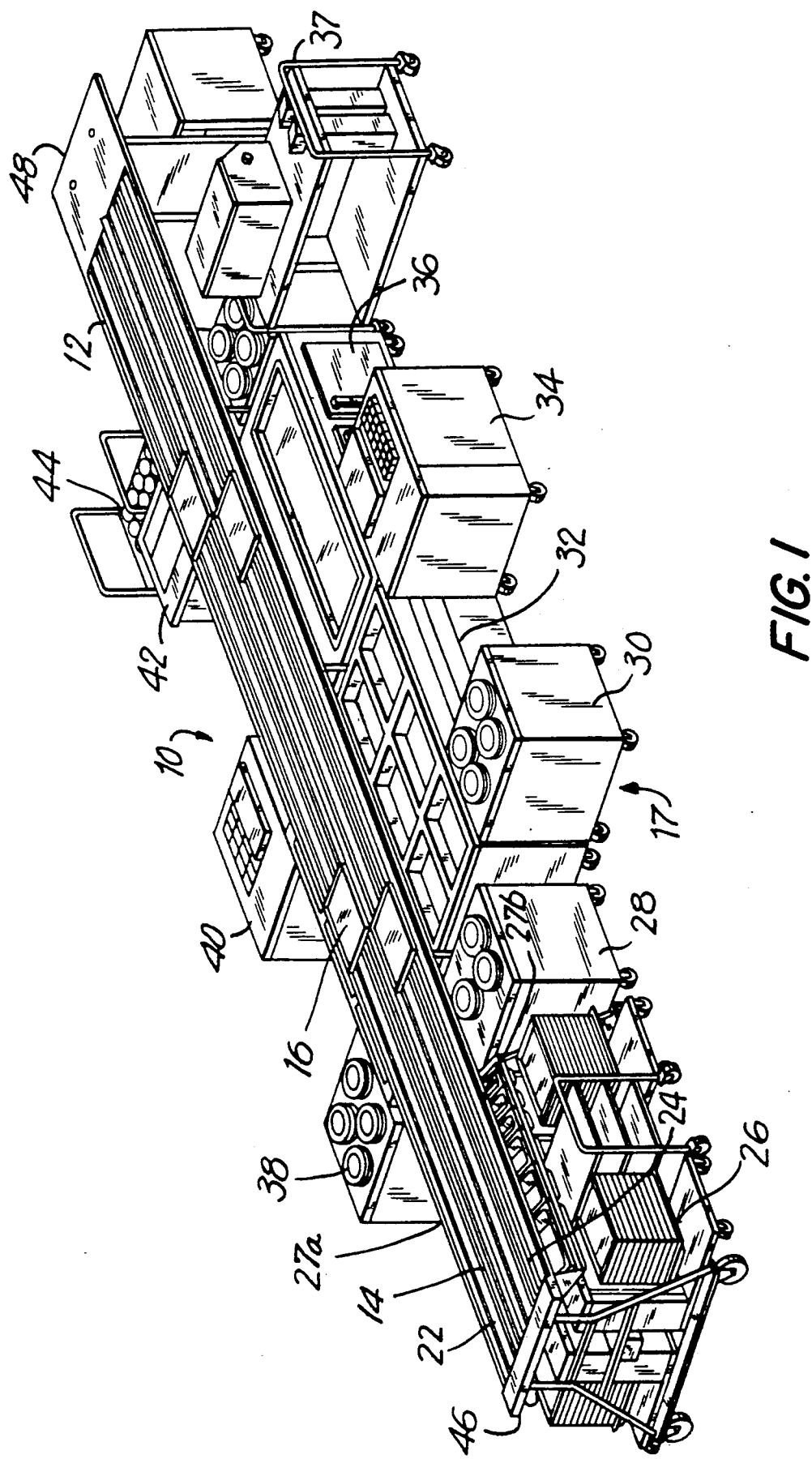
FIG. 1 is a front perspective view of a conveyor system constructed in accordance with the present invention.

Referring now to the drawings in detail and initially to FIGS. 1 and 2 thereof, it will be seen that conveyor system 10 constructed in accordance with the present invention includes a frame 12 (typically formed of stainless steel) that defines a conveyor path of travel 14 to be described in more detail below. This conveyor is of great length and is of the type which is used in the food service industry to transport food trays 16, soiled trays or the like between different work stations. Although in the preferred embodiment, food trays or soiled trays are transported along the conveyor system, the conveyor system is readily adaptable to transporting other objects, such as containers, boxes, etc.

Figure 2:
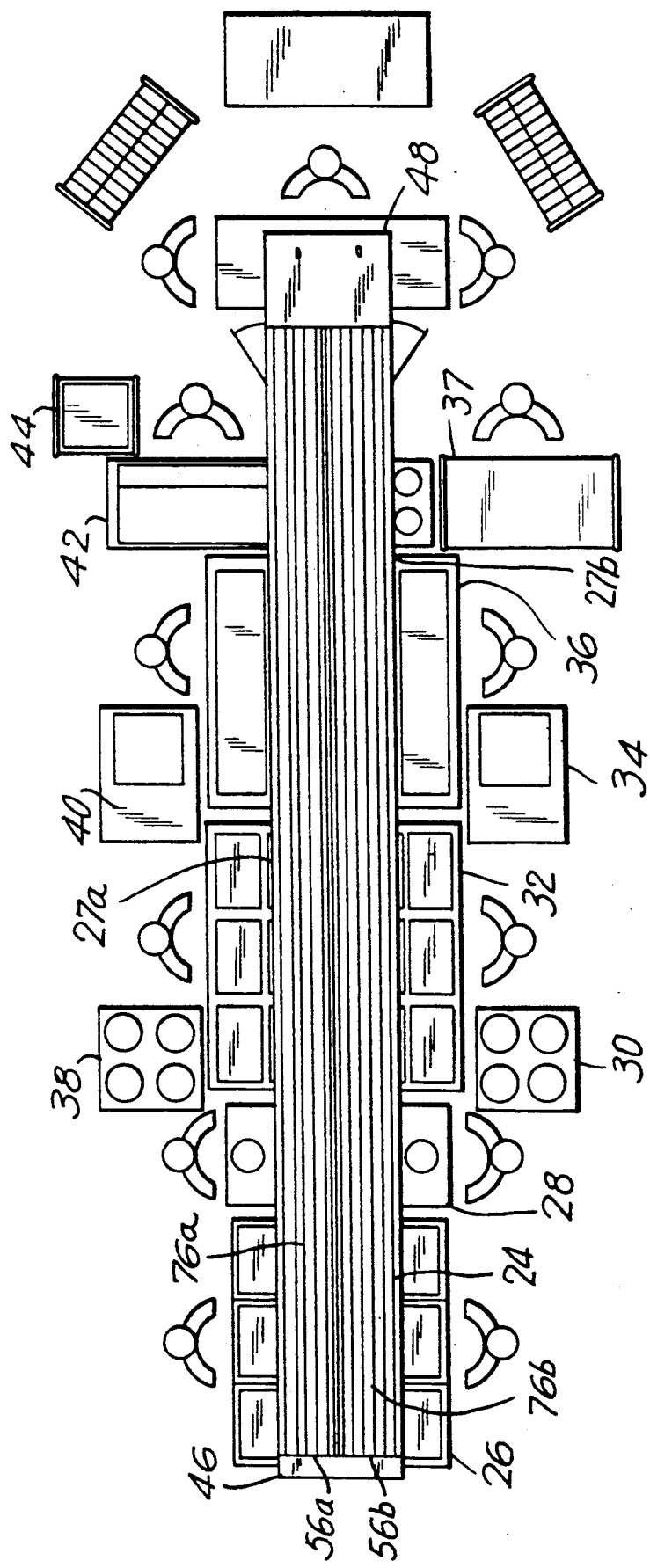
FIG. 2 is a top plan view of the conveyor system in FIG. 1.

As is shown in FIGS. 1 and 2, two sets of conveyor beds 22 and 24 are mounted to frame 12. A plurality of work stations 17 are provided adjacent to the free side edge 27a and b of each conveyor bed on opposites sides of frame 12. In food preparation, at each work station a different food or beverage container or food item is placed on each tray as it moves along the conveyor bed. For soiled tray systems, soiled dishes are transported from the cafeteria to the ware-washing area. For instance, in food tray preparation, as illustrated in FIGS. I and 2, along conveyor bed line 22, the work stations 17 include a heater plate dispenser 38, an ice cream dispenser 40, a coffee urn stand 42 and a mug dispenser 44. The work stations along conveyor bed line 24 include a tray dispenser 26, a heated underliner dispenser 28, heater plate dispenser 30, a well hot food unit 32, a beverage dispenser 34, a cold food unit 36, and a toaster caddy 37. In some cases, in order to conserve space, portions of the work stations are positioned underneath the conveyor beds (see for instance, hot food unit 32).

As shown in FIGS. 3 and 4, the pair of conveyor beds 22 and 24 are mounted on the frame 12 and each define an upper flight path 64 to move the tray containers thereon. The trays move along each conveyor bed from the tail end section 46 to the discharge or drive end section 48. The conveyor beds include a flat portion 50a and b depending inwardly from side edges 52a and b of the conveyor beds, a retention surface 54a and b joined to the flat portion and angled downwardly to the conveyor bed line 22 and 24(see FIG. 5). The tray sides are constrained within the conveyor bed lines by the retention surfaces 54a and b. The other side edge 56a and b of the conveyor beds are joined to a central box channel 68 to be described in more detail below.

Figure 5:
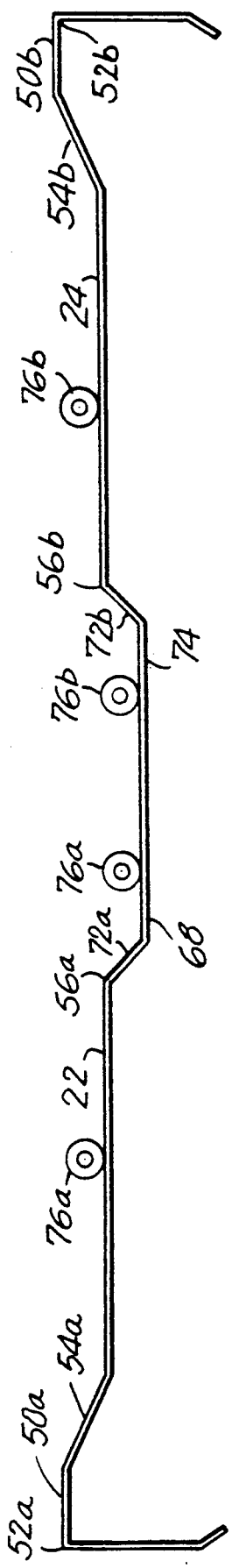
FIG. 5 is a partial cross-sectional view taken along line 5—5 of FIGS. 3 and 4.

As shown in FIG. 3, a central box channel 68 is mounted on frame 12 between and juxtaposed to conveyor beds 22 and 24 and defines a lower return flight path of the conveyor system. The channel as shown in FIG. 5 is mounted below side edges 56a and b of the conveyor beds which are opposite to the side edges 52a and b, respectively, adjacent to the work stations 17. As best shown in FIG. 5, the central box channel is defined by upstanding sides 72a and b and a base number 74. The upstanding sides angle upwardly from the base member 74 to the side edges 54a and b of the conveyor bed to form a trough which constrains the conveyor belts during their lower return flight path.

A pair of endless, continuous conveyor belts 76a and 76b move between the corresponding upper and lower return flight paths of the conveyor beds 22 and 24, respectively. Preferably, the belts are approximately one-half inch in diameter and made of a flexible, polymeric material. In contrast to a chain link conveyor belts, a flexible, round belt allows the belts to be conveniently removed from the conveyor system. Additionally, since the belts have no corners, they are advantageous for food handling systems, and are not as susceptible to wear. Furthermore, as will described in more detail below, a round belt is advantageous in situations where a conveyor bed and box channel have a curved section, as the tension throughout the cross-section of the belt is generally uniform as the belt passes through the curved section.

The conveyor belts ride on top of the conveyor beds during their upper flight path and transport the tray containers from the tail end 46 to the drive end 48 of the conveyor beds. After the tray containers are removed from the conveyor bed at the discharge end, the belts pass through a belt drive arrangement and then along their lower return flight path adjacent base member 74 of box channel 68.

Figure 6:
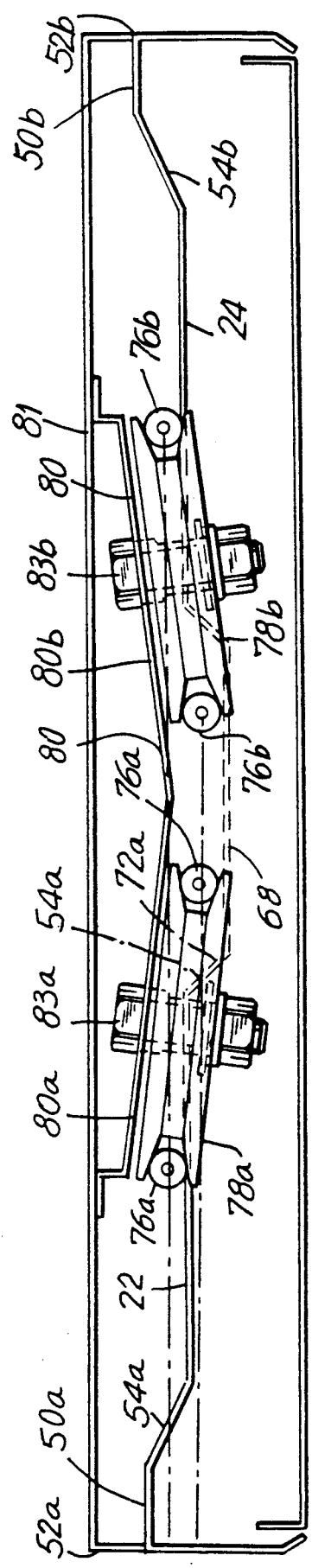
FIG. 6 is a partial cross-sectional view in partial cross-section taken along line 6-6 of FIGS. 3 and 4 specifically illustrating the tail end pulleys incorporated within the conveyor frame.

In accordance with the general aspect of this invention, a conveyor system is provided for the food service industry which is extremely sanitary as the conveyor belts move through the box channel on their lower return flight path which is positioned between the conveyor beds remote from the work stations 17. In order to achieve this result, the belts must be raised from their lower return flight path position in the box channel to their higher position during their upper flight path along the conveyor beds. The applicant has thus developed a novel pulley system which accomplishes this result. As shown in FIG. 6, a pair of first pulleys 78a and b are positioned adjacent to tail end 46 of the conveyor beds. Pulley 78a receives belt 76a from the box channel and directs it to the upper flight path of conveyor bed 22. Similarly, pulley 78b receives belt 76b from the box channel and directs it to the upper flight path of conveyor bed 24. The tail pulleys 78a and b are mounted to a support bracket 80 downwardly depending from the tail cover 81 of the frame 12. The support bracket 80 includes a generally declining section 80a to which pulley 78a is mounted and an upwardly inclined section 80b to which pulley 78b is mounted. Approximately one-half inch bolts 83a and b are welded to the bottom of the bracket to mount the central axis of tail pulleys 78a and b to the support bracket. This permits the tail pulleys 78a and b to be generally horizontally aligned with respect to the conveyor path of travel and angled upwardly from the box channel to the conveyor bed such that the belts in their lower return flight path within the box channel are moved upwardly to the corresponding upper flight path of the conveyor bed.

Figure 7:
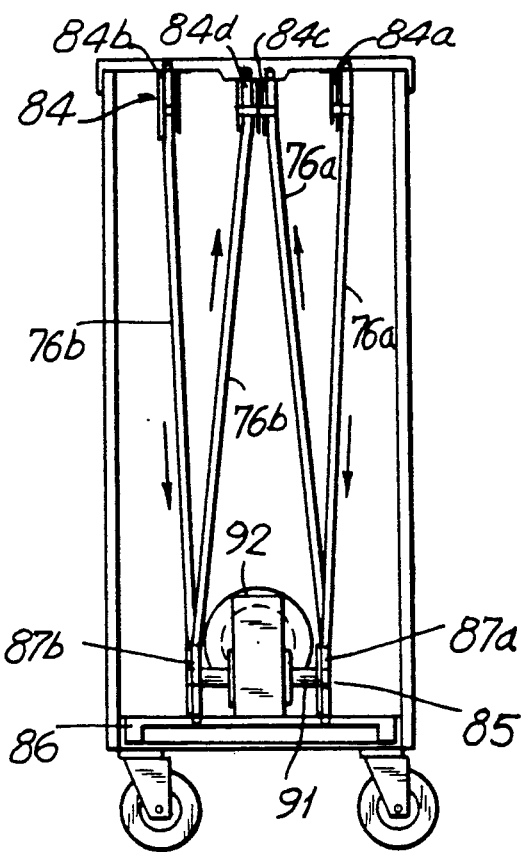
FIG. 7 is a cross-sectional view taken along lines 7—7 of FIGS. 3 and 4.
Figure 9:
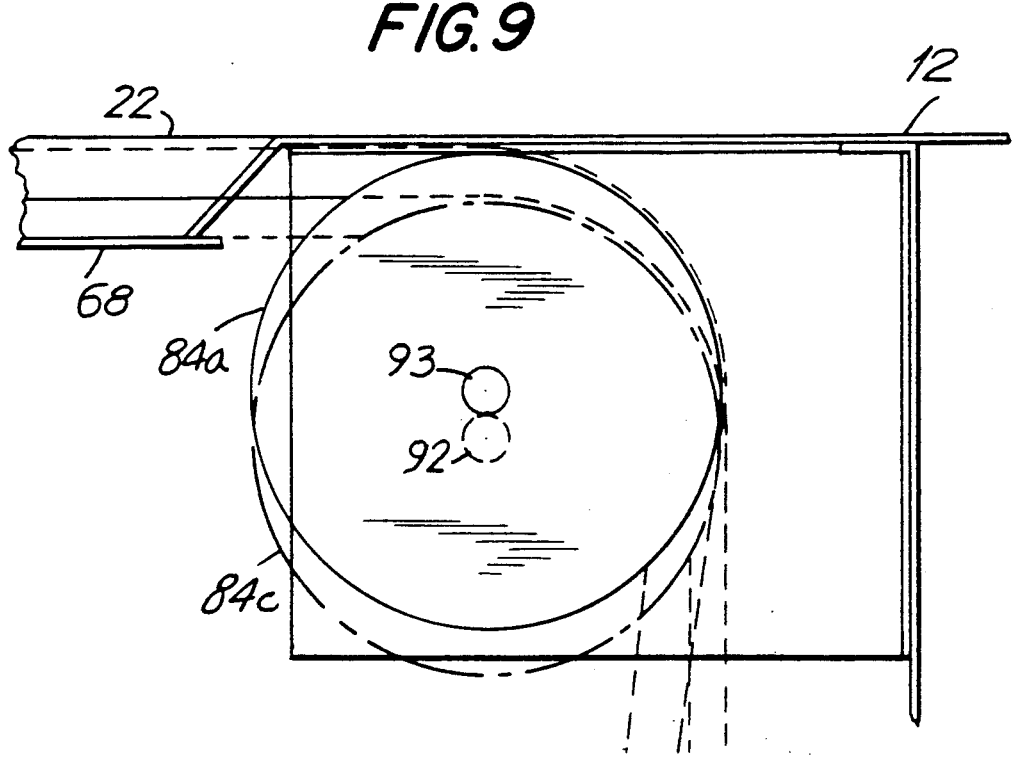
FIG. 9 is a front elevational view partly broken away of the drive pulleys of FIG. 8.

As shown in FIG. 7, a second set of drive pulleys 84 and a belt drive unit 85 mounted on the frame base support 86 generally normal to the drive pulleys 84 form the drive assembly of the conveyor belts at the drive end 48 of the conveyor. The second pulleys 84 are generally vertically aligned and positioned just below the conveyor bed surface (see FIG. 8 and 9). The outer pulleys 84a and b of the second set of pulleys receive belts 76a and b, respectively from the upper flight path of the conveyor beds and direct the belts to a third set of pulleys 87a and b of the belt drive unit 85. Belts 76a and b are then directed upwardly through the inner pulleys 84c and d of the second set of pulleys 84, which in turn, direct the belts through the lower return flight path 70 of the box channel 68 towards the first set of horizontally aligned tail pulleys 78.

Figure 8:
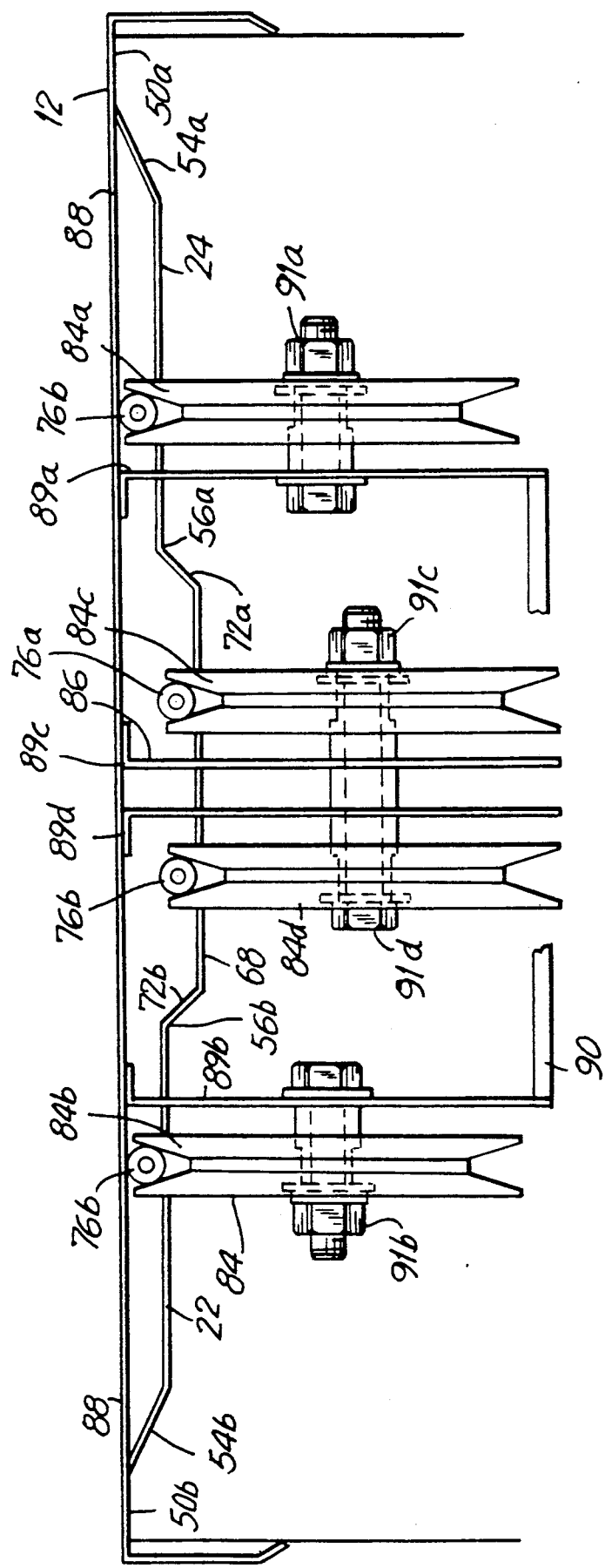
FIG. 8 is a enlarged cross-sectional view of the drive pulley system of FIG. 7.

As shown in FIG. 8, the drive pulleys 84a, b, c and d are mounted to the frame cover 88 by support brackets 89a, b, c, and d, respectively, extending downwardly therefrom. The support brackets are supported in their generally vertical positions by a rod brace 90 joining the support brackets. As shown in FIG. 8, the central axis of outer pulleys 84a and b are rotatably mounted to support brackets 89a and b by fasteners 91a and b and the central axis of inner pulleys 84c and d are rotatably mounted to support brackets 89c and d by fasteners 91c and d. As a result of this design, the central axis 92 of the inner drive pulleys are mounted below the central axis 93 of the outer drive pulleys (see FIG. 9). This permits the belts 76a and b to be received by the outer drive pulleys 84a and b from the conveyor beds 22 and 24, and additionally, permits the belts 76a and b to be passed through the inner drive pulleys 84c and d into the lower return flight path of box channel 68.

As shown in FIG. 7, the belt drive unit 85 includes the third set of pulleys 87a and b and a speed reducer 91 in meshing engagement with the third set of pulleys 87a and b. This speed reducer reduces the speed of the output shaft of D.C. motor 92 which drives the conveyor belts.

The conveyor frame 12 also includes leg assemblies 95 (see FIG. 10) which are positioned at predetermined intervals along frame 12 such that the individual work stations 17 can be positioned under the conveyor beds between adjacent leg assemblies 95. The leg assemblies are supported on the support ground surface 95b by wheel fasteners, such as at 100a. At the drive end 48 of the conveyor, a housing 96 is provided which contains the D.C. motor 92 driving belts 76a and b. Furthermore, as illustrated in FIG. 10, an electrical outlet 97 connects the D.C. motor to an electrical outlet (not shown). At the tail end 46 of the conveyor, a tail access door 98 is provided for servicing of the tail pulleys 78a and b.

The leg assembly structure supporting the conveyor beds and box channel is shown in greater detail in FIG. 11. In some circumstances, the leg assemblies 95 include a pair of bent leg segments 99a and b which are joined at one end to the conveyor beds and at their other end to casters 100a and b which support the frame on the support surface 95b. Although the leg segments 99a and b are shown as being bent in FIG. 11, they could be straight as well. A cross bracing 102 connects the bent or straight leg segments 99a and 99b to reliably support the leg segments in their upstanding position. As shown in FIG. 11, a riser 104 extends upwardly from the cross bracing 102 to a wireway 106 supporting box channel 68. In certain applications, a wireway is not necessary, and therefore, the riser 104 is omitted.

In some instances, in order to conform to the building requirements for soiled tray applications, it is necessary for such conveyor systems to be able to negotiate a curved path. As is illustrated in FIGS. 4, 12 and 13, curved sections 108a and b may be provided along conveyor beds 22 and 24, respectively, and a corresponding curved section 108c may be provided along box channel 68. The curved sections 108a and b of conveyor beds 22 and 24, respectively, include raised portions such as 110a and b, formed upwardly on both sides of belts 76a and b within the upper flight path. The curved section 108c of the box channel also includes raised portions, such as 110c and d, formed upwardly on both sides of belts 76a and b within the lower flight path. These raised portions are made of a polymeric natural and retain the belts within the upper and lower flight paths along the curved section of the conveyor beds and the box channel. Since belts 76a and b are of approximately one-half inch diameter cross-section and made of a flexible, polymeric natural, the belts transporting the tray containers can easily negotiate the curved section of the conveyor bed and box channels as the tension in the cross-section of the belts while in the curved sections is nearly uniform. Furthermore, in order to retain the tray containers along the conveyor bed, especially along the curved sections, certain tray stops 112 are positioned along the side edge of the conveyor to direct the tray containers along the proper path of travel.

Accordingly, a conveyor system for use in the food service industry for food preparation or soiled trays has been developed which is extremely sanitary, relatively simply constructed, relatively lightweight and easily cleaned.

While the present invention has been particularly shown and described with reference to preferred embodiments, it will be readily apparent to those of ordinary skill in the art that various changes and modifications may be made without departing from the spirit and scope of the invention. For instance, although this conveyor system is described as being preferably utilized in the food service industry, it can be readily adapted to any industry which requires such conveyor systems, such as warehousing, etc. Furthermore, the sanitary advantages of the present invention will also be attained if only a single conveyor bed is utilized with the box channel being positioned juxtaposed to the conveyor bed and joined to the side edge of the conveyor bed opposite the side edge adjacent the work stations. It is intended that the appended claims be interpreted as including the foregoing as well as various other such changes and modifications.

What is claimed is:

1. A conveyor system comprising:
   a frame;

a conveyor bed mounted on said frame having first and second ends and defining an upper flight path;

a central box channel mounted on said frame below and juxtaposed to said conveyor bed defining a lower return flight path;

endless conveyor belt means moving between said upper and lower return flight paths; and means for driving said conveyor belt means including first pulley means being fixedly secured adjacent to and extending outwardly beyond said first end and being generally horizontally aligned and angled upwardly such that said belt means in said lower return flight path of said box channel is moved upwardly to said upper flight path of said conveyor bed, said driving means also including second pulley means being disposed adjacent to said second end and being operatively connected to a belt drive unit such that said belt means is moved from said upper flight path to said lower return flight path whereby said belt means is constrained within said box channel along its lower return flight path.

2. The conveyor system as set forth in claim 1 wherein said belt means is made of a flexible, polymeric material.

3. The conveyor system as set forth in claim 1 wherein said box channel is defined by angular upstanding sides and a base member such that said belt means moves in said lower return flight path adjacent said base member.

4. The conveyor system as set forth in claim 1 wherein said second pulley means is generally vertically aligned and disposed underneath said conveyor bed.

5. The conveyor system as set forth in claim 1 wherein said belt drive unit includes third pulley means of generally vertical orientation operatively connected to said second pulley means, speed reducing means in meshing engagement with said third pulley means, and motor means for driving said speed reducer whereby said belt means is moved through said third pulley means toward said lower return flight path of said box channel.

6. The conveyor system as set forth in claim 1 wherein said conveyor bed and said box channel include corresponding curved sections.

7. The conveyor system as set forth in claim 6 wherein said conveyor bed and box channel curved sections include raised portions on both sides of said belt means formed of a polymeric material to retain said belt means within said upper and lower flight paths within said curved sections.

8. A conveyor system comprising:

a frame;

a pair of conveyor beds mounted on said frame, each conveyor bed having first and second ends and each defining an upper flight path;

a central box channel mounted on said frame below and between said conveyor beds and juxtaposed thereto and defining a pair of lower return flight paths;

a pair of endless conveyor belt means moving between said corresponding upper and lower return flight paths; and means for driving each said pair of conveyor belt means including first pulley means having a pair of first pulleys being fixedly secured adjacent to and extending outwardly beyond each said first end and being horizontally aligned and angled upwardly such that each of said pair of belts means in said lower return flight path is moved upwardly to said corresponding upper flight path of said conveyor bed, said driving means also including second pulley means being disposed adjacent to each said second end and being operatively connected to a belt drive unit such that each of said pair of belt means is moved from said upper flight path to said lower return flight path whereby said pair of belts means are constrained within said box channel along their lower return flight paths.

9. The conveyor system as set forth in claim 8 wherein said box channel is defined by upstanding sides each joined to said conveyor bed, and a base member such that said pair of belt means moves in their lower return paths adjacent said base member.

10. The conveyor system as set forth in claim 8 wherein said belt drive unit includes third pulley means operatively connected to each of said second pulley means, speed reducing means in meshing engagement with said third pulley means, and motor means for driving said speed reducer whereby said pair of belt means are moved through said third pulley means toward said lower return flight paths of said box channel.

11. The conveyor system as set forth in claim 8 wherein said conveyor beds and said box channel include corresponding curved sections, each said curved section of said conveyor beds and box channel including raised portions on each side of said belt means moving through each said conveyor bed and said box channel, said raised portions being formed of a polymeric material to retain said pair of belt means within each said upper and lower flight paths along said curved sections.

12. The conveyor system as set forth in claim. 8 wherein said pair of belt means are belt made of a flexible, polymeric material.

13. A conveyor system comprising:

a frame;

a conveyor bed mounted on said frame having first and second ends, and defining an upper flight path to move tray containers thereon, said conveyor bed also including two side edges;

a plurality of work stations being positioned along one of said side edges of said conveyor bed with a different object being placed on said tray containers at each said work station;

a central box channel mounted on said frame below the other said side edge of said conveyor bed opposite to said work stations, said central box channel defining a lower return flight path;

endless conveyor belt means moving between said upper and lower return flight paths; and means for driving said conveyor belt means including first pulley means being fixedly secured adjacent to and extending outwardly beyond said first end and being generally horizontally aligned and angled upwardly such that said belt means in said lower return flight path of said box channel is moved upwardly to said upper flight path of said conveyor bed, said driving means also including second pulley means being disposed adjacent to said second end and being operatively connected to a belt drive unit such that said belt means is moved from said upper flight path to said lower return flight path whereby said belt means is constrained within said box channel along its lower return flight path remote from said work stations.

14. The conveyor system as set forth in claim 13 wherein said belt means is made of a flexible, polymeric material.

15. The conveyor system as set forth in claim 13 wherein said box channel is defined by upstanding sides and a base member such that said belt means moves in said lower return flight path adjacent said base member.

16. The conveyor system as set forth in claim 13 wherein said belt drive unit includes third pulley means of generally vertical orientation operatively connected to said second pulley means, speed reducing means in meshing engagement with said third pulley means, and motor means for driving said speed reducer whereby said belt means is moved through said third pulley means toward said lower return flight path of said box channel.

17. The conveyor system as set forth in claim 13 wherein said conveyor bed and said box channel include corresponding curved sections.

18. The conveyor system as set forth in claim 17 wherein said conveyor bed and box channel curved sections includes raised portions on both sides of said belt means which are formed of a polymeric material to retain said belt means in said upper and lower flight paths along said curved sections.

19. A conveyor system comprising:
a frame;
a pair of corresponding conveyor beds mounted on said frame, each conveyor bed having first and second ends and defining an upper flight path to move tray containers thereon, each said conveyor bed also including two side edges;
a plurality of work stations being positioned along one side edge of each said conveyor bed with a different object being placed on said tray containers at each said work station;
a central box channel mounted on said frame between said pair of conveyor beds, said channel being mounted below the side edge of each conveyor bed opposite to said work stations, said central box channel defining a lower return flight path;
a pair of endless conveyor belt means moving between said corresponding upper and lower return flight paths;
means for driving said pair of conveyor belt means including first pulley means having a pair of first pulleys being fixedly secured adjacent to and extending outwardly beyond each said first end and being horizontally aligned and angled upwardly such that each of said pair of belt means in said lower return flight path is moved upwardly to said corresponding upper flight path of each said conveyor bed, said driving means also including second pulley means being disposed adjacent to each said second end and being operatively connected to a belt drive unit such that each of said pair of belt means is moved from said upper flight path to said lower return flight path whereby said pair of belt means are constrained within said box channel along their lower return flight path remote from said work stations.

20. The conveyor system as set forth in claim 19 wherein said box channel is defined by upstanding sides each joined to one said side edge of each conveyor bed, and a base member such that said pair of belt means move in their lower return paths adjacent to said base member.

21. The conveyor system as set forth in claim 19 wherein said belt drive unit includes third pulley means operatively connected to each of said second pulley means, speed reducing means in meshing engagement with said third pulley means, and motor means for driving said speed reducer whereby said pair of belt means are moved through said third pulley means toward said lower return flight paths of said box channel.

22. The conveyor system as set forth in claim 19 wherein said conveyor beds and said box channel include corresponding curved sections, each said curved section of said conveyor beds and said box channel including raised portions of each side of said belt means which are formed of a polymeric material to retain said pair of belt means within said upper and lower flight paths along said curved sections.

23. The conveyor system as set forth in claim 19 wherein said pair of belt means are made of a flexible, polymeric material.

* * * * *